United States Patent [19]
Ogawa

[11] Patent Number: 5,644,126
[45] Date of Patent: Jul. 1, 1997

[54] MANUAL IMPLEMENT FOR INPUTTING INCREMENTAL INFORMATION BY ATTITUDE CONTROL

[75] Inventor: Yasuji Ogawa, Otone-machi, Japan

[73] Assignee: Kabushikikaisha Wacom, Japan

[21] Appl. No.: 445,169

[22] Filed: May 19, 1995

[30] Foreign Application Priority Data

May 20, 1994 [JP] Japan .................................. 6-131363

[51] Int. Cl.$^6$ .................................................. G01D 5/34
[52] U.S. Cl. ...................... 250/231.1; 250/222.1; 250/559.29; 359/142; 345/157; 348/734
[58] Field of Search ................. 250/231.1, 221, 250/222.1, 224, 559.29, 559.24; 345/157, 166; 359/142, 143, 146, 159; 348/569, 570, 734

[56] References Cited

U.S. PATENT DOCUMENTS

| | | | |
|---|---|---|---|
| 4,745,402 | 5/1988 | Auerbach | 340/709 |
| 4,959,721 | 9/1990 | Micic et al. | 358/194.1 |
| 5,023,943 | 6/1991 | Heberle | 455/603 |
| 5,146,210 | 9/1992 | Heberle | 340/709 |
| 5,349,460 | 9/1994 | Ogasahara et al. | 359/142 |
| 5,401,025 | 3/1995 | Smith, III et al. | 273/148 B |

FOREIGN PATENT DOCUMENTS 6-59807  3/1994  Japan .

*Primary Examiner*—Stephone Allen
*Attorney, Agent, or Firm*—Adams & Wilks

[57] ABSTRACT

An information input apparatus inputs information into a machine. An implement is manually operable to vary either of a position and a direction of the implement relative to a reference point. At least one light source is disposed at one of the implement and the reference point for transmitting an optical ray to the other of the implement and the reference point. A detector is disposed at the other of the implement and the reference point for receiving the optical ray to detect a physical variation of either of the position and the direction of the implement so as to input displacement information representative of an incremental/decremental amount into the machine according to the detected physical variation. The detector has a periodic pattern for spatially modulating the optical ray to form a periodic image which shifts in response to the physical variation of the implement. An image sensor of the detector has an array of pixels for capturing the shifting periodical image to output a corresponding periodic signal. A processor is provided for processing the periodic signal to extract therefrom the physical variation of the implement to thereby form the displacement information which is fed to the machine.

24 Claims, 14 Drawing Sheets

MANUAL IMPLEMENT FOR INPUTTING INCREMENTAL INFORMATION BY ATTITUDE CONTROL

BACKGROUND OF THE INVENTION

The present invention relates to an information input apparatus having a manual implement such as a remote controller for controlling a television set. Further, the information input apparatus may also be used in a game machine having a display, a personal computer, and a word processor for menu operations and pointing operation. Moreover, the information input apparatus can be used for input of figures and hand-written characters, and for manipulation of a graphic object on a screen.

There are various types of conventional manual information input tools such as a digitizer composed of a stylus and a tablet, and a mouse pointing implement. In operation of the digitizer, the stylus and the tablet exchange an electromagnetic signal or other signals therebetween to detect an absolute position of the stylus, which is inputted into a computer. The mouse pointing implement is manually moved over a pad or other flat surface to input incremental displacement information into the computer. The digitizer detects an absolute position of the stylus, whereas the mouse implement detects a relative displacement thereof. However, the digitizer and the mouse implement each requires that the tablet or the pad be disposed on a working table. Therefore, these manual tools suffer from limited working condition and space.

There is another type of a manual input tool called an "optical pointer" which can be operated freely of a working table. The optical pointer is disclosed in Japanese Patent Application Laid-Open No. 6-59807. The optical pointer having a light source is manually handled, while a computer is provided with a video camera for capturing the light source to detect a position of the optical pointer. A cursor displayed on a screen of the computer machine is displaced according to the detected position of the optical pointer. The optical pointer is captured by the video camera to detect the absolute position of the light source. Therefore, the optical pointer is an absolute position detector like the digitizer. However, the video camera is too complex for use in a handy input tool. In a practical sense, absolute detection is not needed for cursor manipulation and menu selection. Relative displacement information may be sufficient in most applications as provided by the mouse pointing implement.

SUMMARY OF THE INVENTION

In view of the above noted drawbacks of the prior art, an object of the invention is to provide an information input apparatus which has a simple construction and which can be freely handled by manual operation.

According to the present invention, an information input apparatus for inputting information into a machine comprises an implement manually operable to vary one a position and a direction of the implement relative to a reference point, at least one light source disposed at one of the implement and the reference point for transmitting an optical ray to the other of the implement and the reference point, and a detector disposed at the other of the implement and the reference point for receiving the optical ray to detect a physical variation of either of the position and the direction of the implement so as to input displacement information representative of an incremental/decremental amount into the machine according to the detected physical variation. The detector comprises modulation means having a periodic pattern for spatially modulating the optical ray to form a periodic image which shifts in response to the physical variation of the implement, receiving means composed of an image sensor having an array of pixels for capturing the shifting periodical image to output a corresponding periodic signal, and processor means for processing the periodic signal to extract therefrom the physical variation of the implement to thereby form the displacement information which is fed to the machine. Practically, the implement includes switch means manually actuated to input a start command effective to control the processor means to start extraction of the physical variation of the implement.

In one form, the light source is disposed at the reference point, while the detector is integrated into the implement so that the detector detects the physical variation of the implement in terms of an incident direction of the optical ray, which varies in response to the manual operation of the implement. In another form, the light source is disposed at the implement, while the detector is disposed at the reference point so that the detector detects the physical variation of the implement in terms of an incident position of the optical ray, which varies in response to the manual operation of the implement.

In a specific construction of the detector, the modulation means has a periodic pattern extending along a one-dimensional direction, the receiving means is composed of a linear image sensor having a linear array of pixels aligned in the one-dimensional direction, and the processor means extracts the physical variation of the implement in the one-dimensional direction. In another construction, the modulation means has a periodic pattern extending in a two-dimensional direction, the receiver means is composed of an area image sensor having a planar array of pixels aligned in the two-dimensional direction, and the processor means extracts the physical variation of the implement in the two-dimensional direction. In still another construction, the modulation means has a pair of one-dimensional periodic patterns separate from each other and orthogonal to each other, the receiving means comprises a pair of linear image sensors disposed orthogonally to each other and each having a linear array of pixels aligned in a one-dimensional direction, and the processor means processes the periodic signals fed from the pair of the linear image sensors to extract a two-dimensional physical variation of the implement. In a still further construction, the modulation means has a periodic pattern two-dimensionally patterned along first and second directions, the receiving means comprises a linear image sensor having a linear array of pixels aligned in a third direction which intersects with the first and second directions at different angles, and the processor means processes the periodic signal fed from the linear image sensor to extract a two-dimensional physical variation of the implement. In an application, the implement comprises a remote controller for inputting displacement information into a television set to remotely control the television set according to the displacement information.

In operation of the inventive information input apparatus, in the case that the detector is integrated in the implement, an operator holds the implement and directs the same toward the light source which is disposed at the reference position located at the machine. Then, the position of the implement is varied relative to the optical source while a switch in the implement is depressed. The switch is used to command a start of the detection of the physical variation of the implement. For example, the light source is turned on while the switch is depressed. Relative displacement is caused between the light source and the detector. The optical ray passes from the light source to the receiving means through the modulation means of the detector. The optical ray crosses the periodic pattern of the modulation means such that a crossing point traverses the periodic pattern due to the relative displacement between the light source and the implement. Consequently, the periodic image is projected onto the receiving means and is shifted along a receiving surface of the detector. The shift of the periodic image is analyzed to extract the physical variation of the implement in terms of an attitude relative to the light source. For example, the spatial modulation means may be composed of a lattice slit plate which has a two-dimensional periodic pattern, e.g., a lattice pattern extending in first and second directions orthogonal to each other. The receiving means may be composed of a linear image sensor having a linear array of pixels aligned in a third direction. The linear image sensor is set such that the third direction intersects with the first and second directions at different angles. In such a construction, the linear image sensor produces the periodic signal which contains two periodic components corresponding to the first and second directions, e.g., vertical and horizontal directions. The two periodic components are extracted and separated to detect the two-dimensional physical variation of the implement. In contrast to the absolute position detection of the prior art using the area image sensor, the inventive apparatus can use the linear image sensor to detect the two-dimensional displacement information, i.e., relative position information. The number of pixels needed in the linear image sensor is significantly smaller than that in the area image sensor.

DETAILED DESCRIPTION OF EMBODIMENTS

Figure 1A:
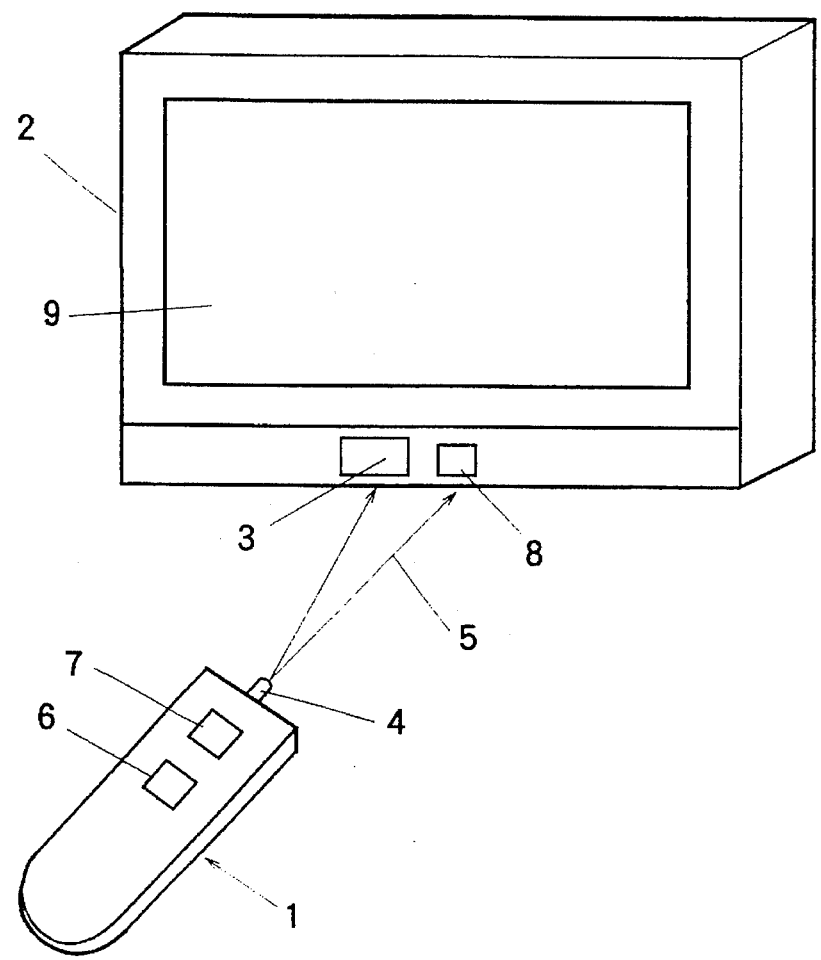
FIG. 1A is a schematic perspective view showing an overall appearance of a first embodiment of the inventive information input apparatus.

Referring to FIG. 1A, a first embodiment of the inventive information input apparatus is applied to a remote controller of a television set. The inventive apparatus is basically comprised of an implement and a detector. The implement is formed of a remote controller 1 which inputs displacement information into the television set 2. Additionally, the remote controller 1 inputs switch information such as channel select information into the television set 2. The remote controller 1 is hand-held and is manually operated to vary its own attitude (position and direction) relative to a reference point. On the other hand, a detector 3 detects a physical variation in the attitude of the remote controller 1, thereby inputting displacement information of an incremental/decremental nature into the television set 2 according to the detected physical variation.

At the least, one light source is disposed at one of the implement and a reference point for transmitting an optical ray to the other of the implement and the reference point. On the other hand, the detector is disposed at the other of the implement and the reference point for receiving the optical ray. In this embodiment, the light source composed of a light emitting diode 4 is integrated in the remote controller 1, while the detector 3 is disposed at the reference point which is fixed to the television set 2. By such an arrangement, an incident position of the optical ray 5 entering the detector 3 varies in response to the manual operation of the remote controller 1.

The remote controller 1 is further provided with a tone volume switch 6 and a channel switch 7. The integrated light emitting diode 4 transmits the optical ray 5 in the form of an infrared light which is modulated to transfer the switch information to the machine. In this connection, a receiver unit 8 is disposed at a lower portion of the television set 2 adjacent to the detector 3. The television set 2 has a screen 9 for displaying a broadcast program or a menu.

Figure 1B:
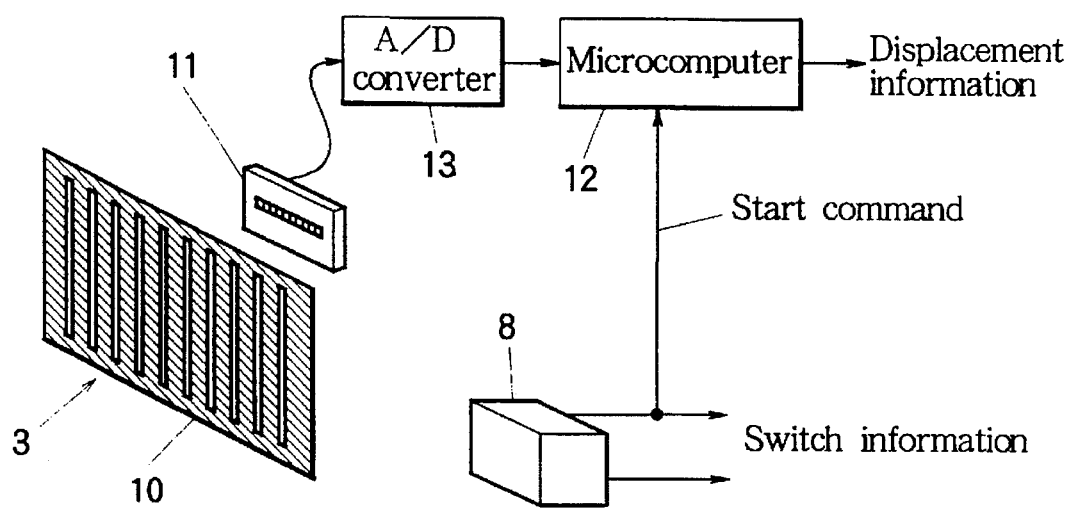
FIG. 1B is a block diagram showing a construction of the first embodiment.

Referring to FIG. 1B, the detector 3 is basically composed of spatial modulation means, receiving means and the processor means. In the present embodiment, the modulation means is composed of a multi-slit plate 10 having a periodic pattern. The multi-slit plate 10 spatially modulates the optical ray emitted from the light source to form a periodic image of bright and dark, which shifts in response to physical variation of the remote controller. Further, the receiving means is composed of a linear image sensor 11 having a linear array of pixels (sensing elements) for capturing the shifting periodic image to produce a corresponding periodic signal. Moreover, the processor means is composed of a microcomputer 12 for processing the periodic signal fed from the linear image sensor 11 to extract the physical variation, i.e., the attitude variation of the implement for producing the displacement information which is inputted into the television set. An A/D converter 13 is interposed between the linear image sensor 11 and the microcomputer 12. The multi-slit plate 10 has a periodic pattern extending in a one-dimensional direction. The linear image sensor 11 has the array of the pixels aligned in the one-dimensional direction. By such an arrangement, the microcomputer 12 extracts the positional variation of the remote controller in the one-dimensional direction. The receiver unit 8 adjacent to the detector 3 receives a modulated component contained in the infrared optical ray transmitted from the remote controller 1, and demodulates the modulated component to extract the switch information, which is fed to the television set. The switch information includes a start command effective to control the microcomputer 12 to start the extraction of the physical variation of the manual implement. The switch information further includes channel select information responsive to actuation of the channel switch 7.

Figure 2:
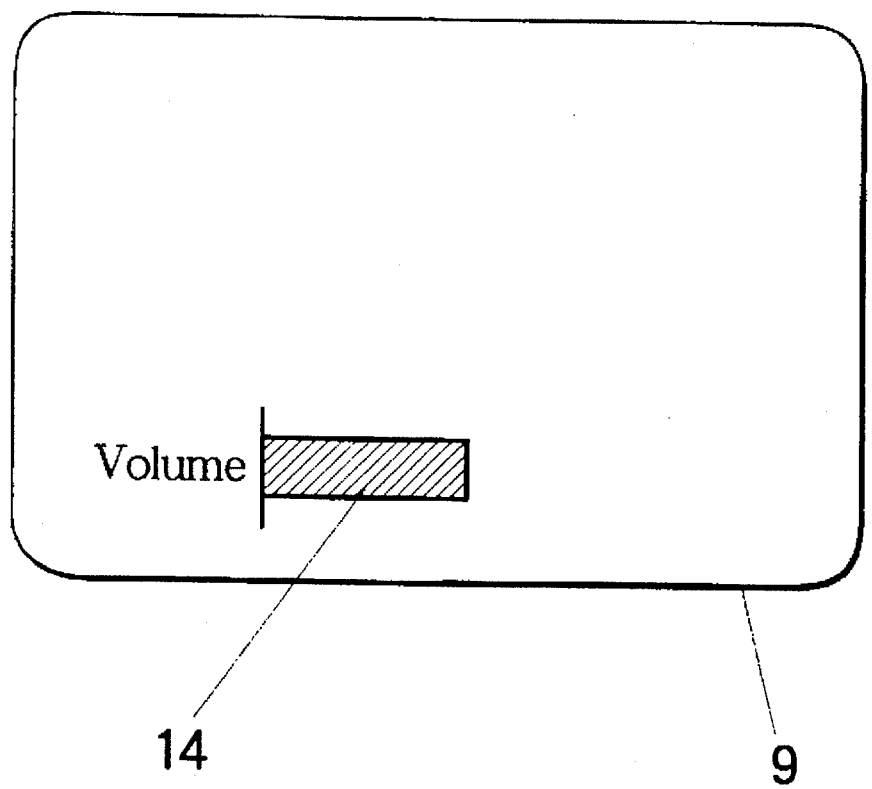
FIG. 2 is a plan view of a display provided in the first embodiment.

Referring to FIG. 2, the remote controller shown in FIG. 1A inputs the displacement information for use in tone volume control of the television set in this embodiment. While the tone volume switch 6 (FIG. 1A) is depressed, the screen 9 displays a bar 14 indicative of the tone volume. The remote controller is moved left and right in the one-dimensional horizontal direction, so that the bar 14 contracts and expands in response to the movement of the remote controller. Then, the tone volume switch is turned off, and the bar 14 is fixed to set a desired tone volume.

Figure 3:
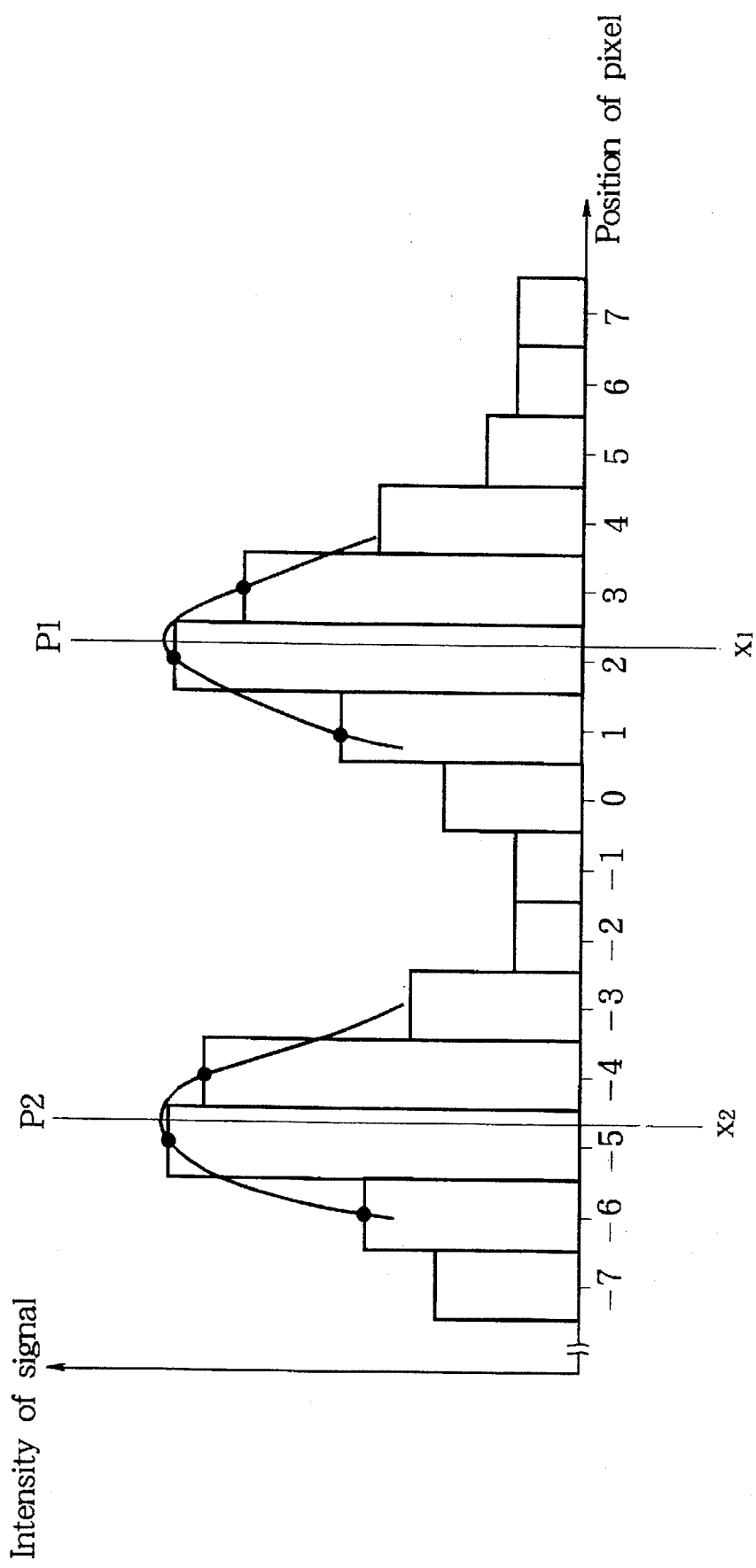
FIG. 3 is a schematic diagram showing a periodic signal generated in the first embodiment.

Referring to FIG. 3, the linear image sensor 11 produces the periodic signal containing several peaks. A graph of FIG. 3 indicates positions of pixels contained in the linear image sensor along a horizontal axis, and indicates a magnitude of the periodic signal in a vertical axis. For the sake of simplicity, the linear image sensor contains fifteen pixels linearly arranged in the horizontal direction. The position of each pixel is indicated by −7 through −7. The position of a center pixel is indicated by 0. The linear image sensor is illuminated by the periodic image through the multi-slit plate 10 (FIG. 1). In the illustrated example, the projected periodic image contains a pair of peaks P1 and P2 within the linear array of the pixels. The pair of peaks P1 and P2 shift over the linear image sensor in response to the displacement of the manual implement, while each pixel successively outputs data representative of the periodic signal.

Figure 4:
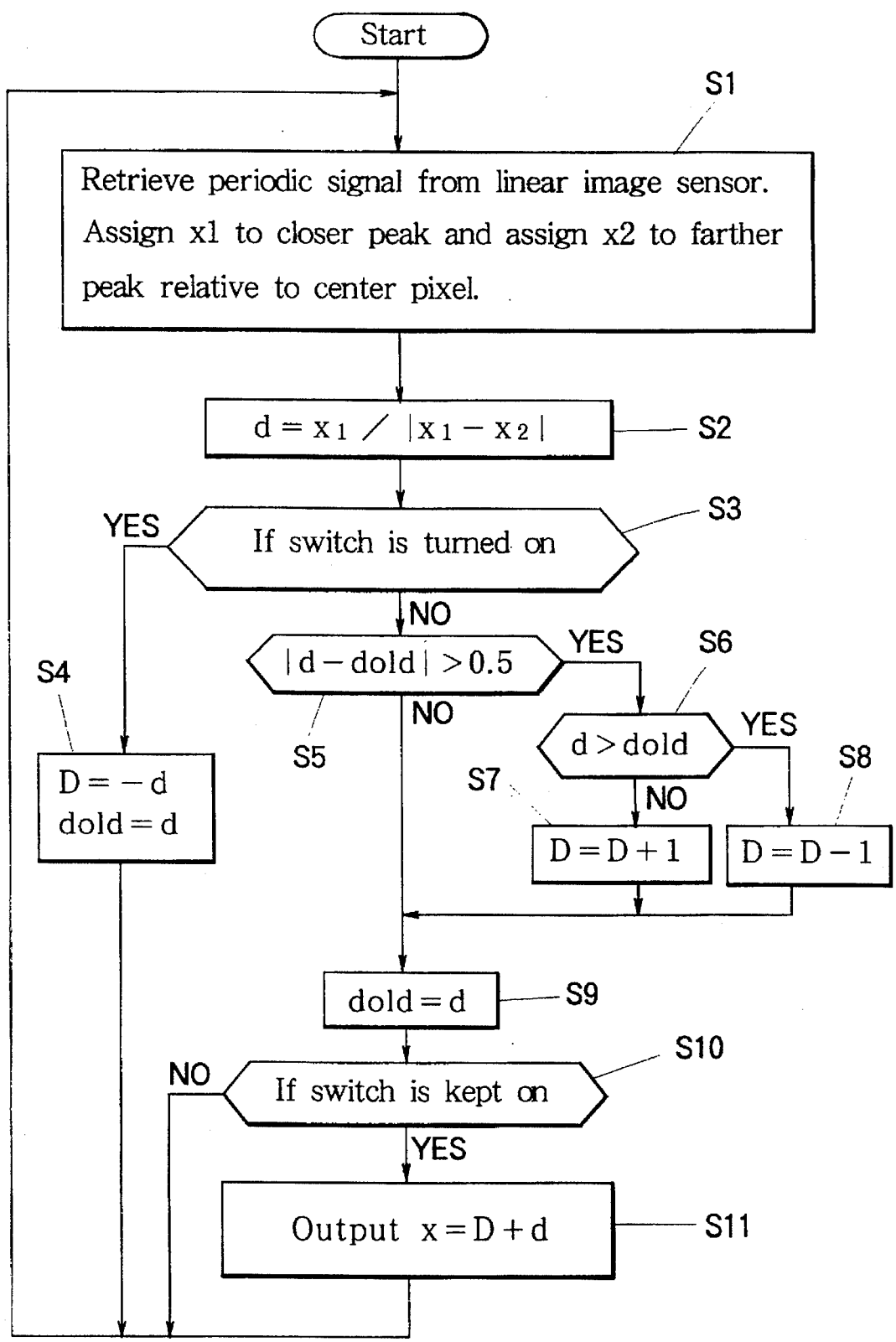
FIG. 4 is a flow chart showing operation of the first embodiment.

Referring to a flow chart of FIG. 4, in operation of the inventive information input apparatus, a first step S1 is undertaken after activating the information input apparatus for retrieving the periodic signal from the linear image sensor to calculate the position of the peaks P1 and P2 by computation processing. One peak position closer to the center pixel is denoted by x1, while another peak position farther from the center pixel is denoted by x2. Namely, the assignment of x1 and x2 is determined according to the positional relation of the peaks P1 and P2 with respect to the center pixel. The position of each peak is calculated in the order of sub-pixel smaller than a pitch of the pixels by parabolic interpolation. An origin of the peak position is set to the center pixel. This peak calculation is repeatedly executed at each sample timing. Then, a next step S2 is undertaken to calculate a displacement $d=x1/|x1-x2|$. The displacement d indicates a shift amount of the periodic image per one sample timing, normalized by an interval between the pair of the peaks. Subsequently, a step S3 is undertaken to check as to if the tone volume switch 6 (FIG. 1) is actuated from an off-state to an on-state. If the check result is YES, the microcomputer is commanded to start the extraction of the displacement. Consequently, a step S4 is undertaken to set a counter D with "−d". Namely, the counter D is initially given an offset value which is determined by a negative value of the initial displacement d calculated by the step S2. Further, the displacement d calculated by the previous step S2 is reserved as "dold".

Thereafter, the routine returns to the step S1 to again calculate x1 and x2 at a next sample timing. Further, a new displacement d is calculated at the step S2. Then, check is made in the step S3 as to if the tone volume switch is turned on. In this case, since the tone volume switch has been already turned on at the previous sample timing, the present check result of the step S3 is NO to thereby branch to a step S5. In this step, check is made as to if $|d-dold|>0.5$. Namely, check is made as to if an absolute value of a difference between a present sample data d and a previous sample data dold exceeds the value 0.5. As shown in FIG. 3, the pair of the peaks P1 and P2 shift in the positive direction (rightward in the figure), hence the peak P1 moves away from the center pixel while the peak P2 approaches the center pixel. When the peak P2 becomes closer to the center pixel than the peak P1, the values x1 and x2 are switched with each other. Accordingly, this switching causes a significant change in the difference between the old data dold sampled just before the switching and the new data d sampled just after the switching. At this moment, a variation of the normalized displacement $d=x1/|x1-x2|$ would reach "1" at maximum. However, actually when the implement is moved faster than the sampling rate, the value of $|d-dold|$ may be less than "1" due to a sampling delay. Practically, it can be judged that x1 and x2 are switched with each other when the value of $|d-dold|$ exceeds "0.5".

If the check result of the step S5 is YES, a next step S6 is undertaken to check as to if d>dold. If this check result is NO, a step S7 is undertaken to increment the value of the counter D by "1". Namely, in case of d>dold, the value of x1 jumps from right to left relative to the center pixel. Namely, the periodic image shifts in the positive direction. Thus, the counter D is incremented to record that the implement displaces one pitch. On the other hand, if the check result of the step S6 is YES, a step S8 is undertaken to decrement the counter D by "1". Namely, the periodic image shifts in the negative direction by one pitch. After the step S7 or step S8, a step S9 is undertaken update the value of dold. Furthers if the check result of the step S5 is NO, immediately the step S9 is undertaken to update dold without incrementing or decrementing the counter D.

Then, a step S10 is undertaken to check as to if the tone volume switch 6 (FIG. 1) is held in the on-state. If the check result is YES, a step S11 is undertaken to output a current value of the displacement x=D+d, which denotes the displacement information. If the check result of the step is NO, the routine returns to step S1 without executing the step S11 since the output of the displacement information is not requested. An integer part of the counter D denotes a number of peaks of the periodic image which have crossed the center pixel, and the value of d denotes a fragment of one pitch between the pair of the peaks.

Figure 5:
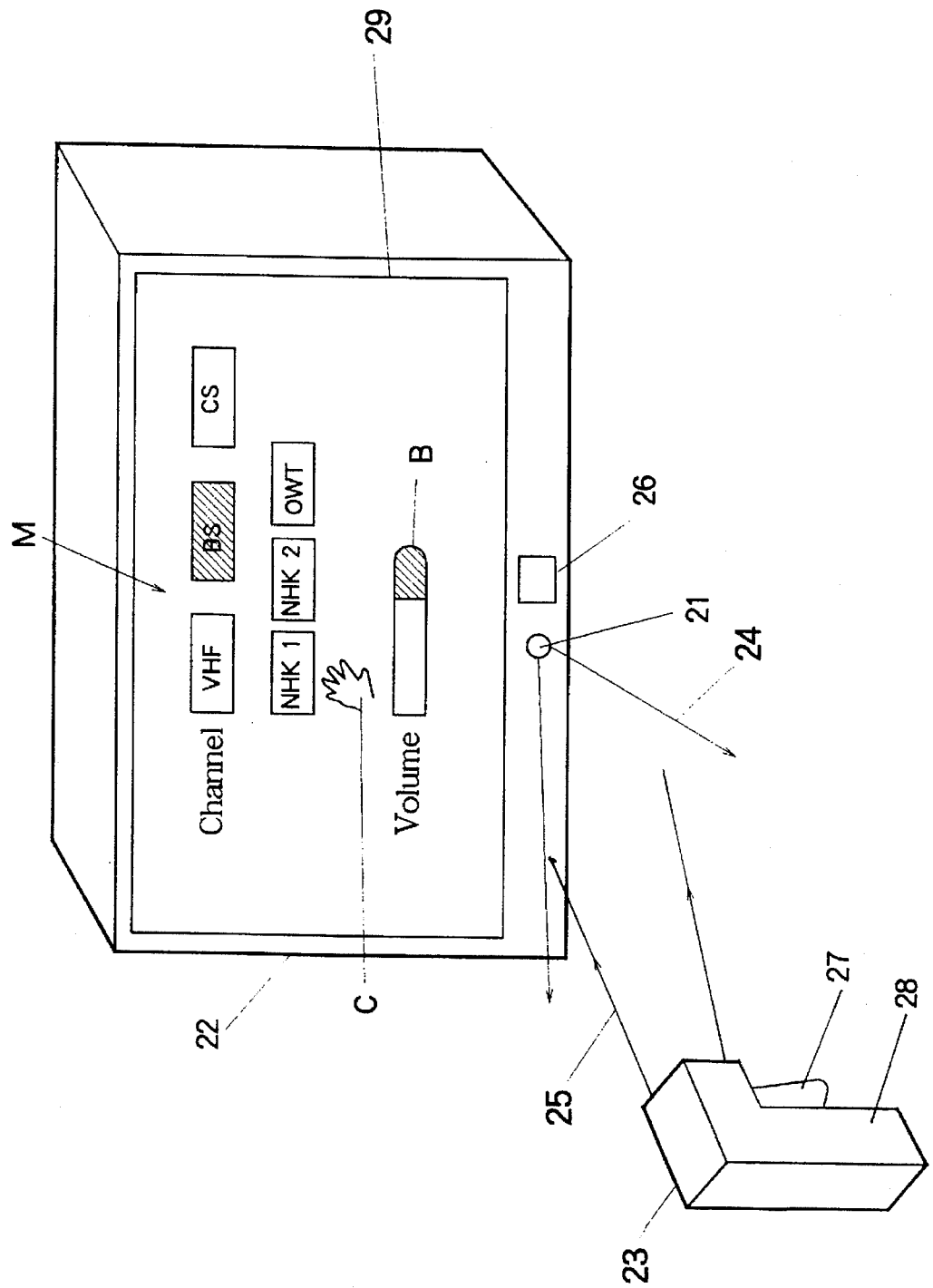
FIG. 5 is a schematic perspective view showing an overall appearance of a second embodiment of the inventive information input apparatus.

Referring to FIG. 5, a second embodiment of the inventive information input apparatus differs from the first embodiment in that the positional relation of the light source and the detector is reversed. Namely, in the second embodiment, the light source of a photoemitting diode 21 is disposed at a reference point of a television set 22, while a detector is integrated into a manual implement composed of a remote controller 23. By such an arrangement, an incident angle of an optical ray 24 to the detector varies in response to the manual articulation of the remote controller 23. The displacement information is extracted according to the variation in the incident angle. The extracted displacement information is transmitted to the television set 22 by means of a transmitter unit integrated in the remote controller 23 through a modulated infrared light beam 25. The television set 22 has a corresponding receiver unit 26. The remote controller 23 is provided with a two-stage switch 27 for inputting switch information and a grip 28 for manual handling, in addition to the transmitter unit. The incident angle of the incoming optical ray significantly varies relative to the detector by the manual handling of the remote controller 23. Consequently, greater displacement information can be inputted by a smaller handling amount of the implement as compared to the first embodiment.

The television set 22 has a screen 29 which displays a menu M, a cursor C and a bar B. The remote controller 23 inputs the displacement information not only to contract/expand the tone volume bar B, but also to scan the cursor C for selection of the menu M. For this purpose, the present embodiment inputs two-dimensional displacement information to effect a two-dimensional pointing operation of the cursor C.

Figure 6:
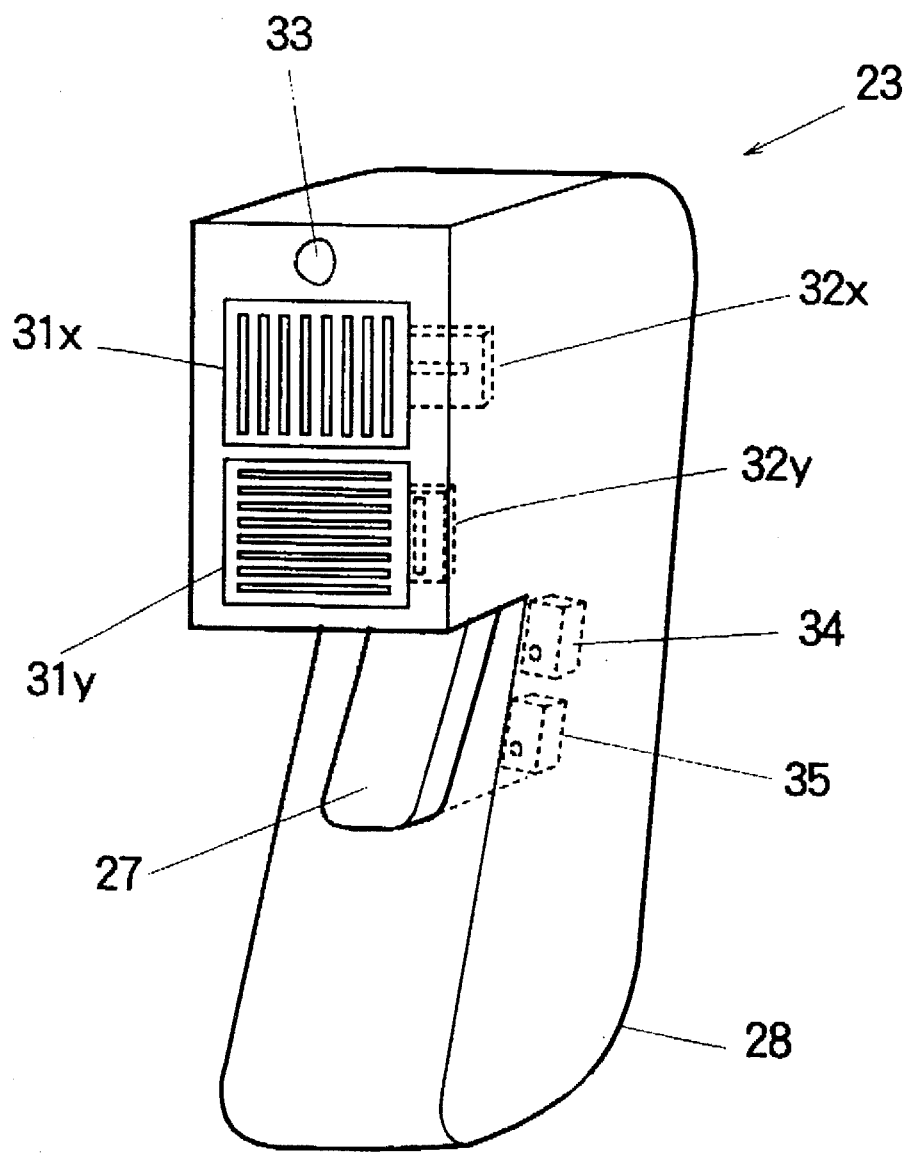
FIG. 6 is a perspective view showing a construction of an implement used in the second embodiment as a remote controller.

Referring to FIG. 6, the remote controller 23 is provided with a pair of multi-slit plates 31x and 31y at a front face to constitute the spatial modulation means. Namely, the modulation means has a pair of one-dimensional periodic patterns which are aligned orthogonally with each other. In detail, the one multi-slit plate 31x has a periodic pattern consisting of a series of vertical slits extending along the horizontal direction, while the other multi-slit plate 31y has a periodic pattern consisting of a series of horizontal slits extending in the vertical direction. A linear image sensor 32x is disposed behind the multi-slit plate 31x, and another linear image sensor 32y is disposed behind the multi-slit plate 31y. The linear image sensor 32x has a plurality of pixels aligned in the horizontal direction. The linear image sensor 32y has a plurality of pixels aligned in the vertical direction. Namely, the pair of linear image sensors 32x and 32y are arranged orthogonally to each other. In this embodiment, periodic signals outputted from the pair of the linear image sensors 32x and 32y are processed to extract a two-dimensional displacement in the horizontal and vertical directions. A transmitter unit 33 is attached to the front face of the remote controller 23 for transmitting the displacement information and switch information to the television set 22. The transmitter unit 33 transmits the modulated infrared beam 25, which is received by the receivier unit 26 disposed at the television set 22. A first contact 34 and a second contact 35 are disposed within the grip 28, which are actuated by the two-stage switch 27.

Figure 7:
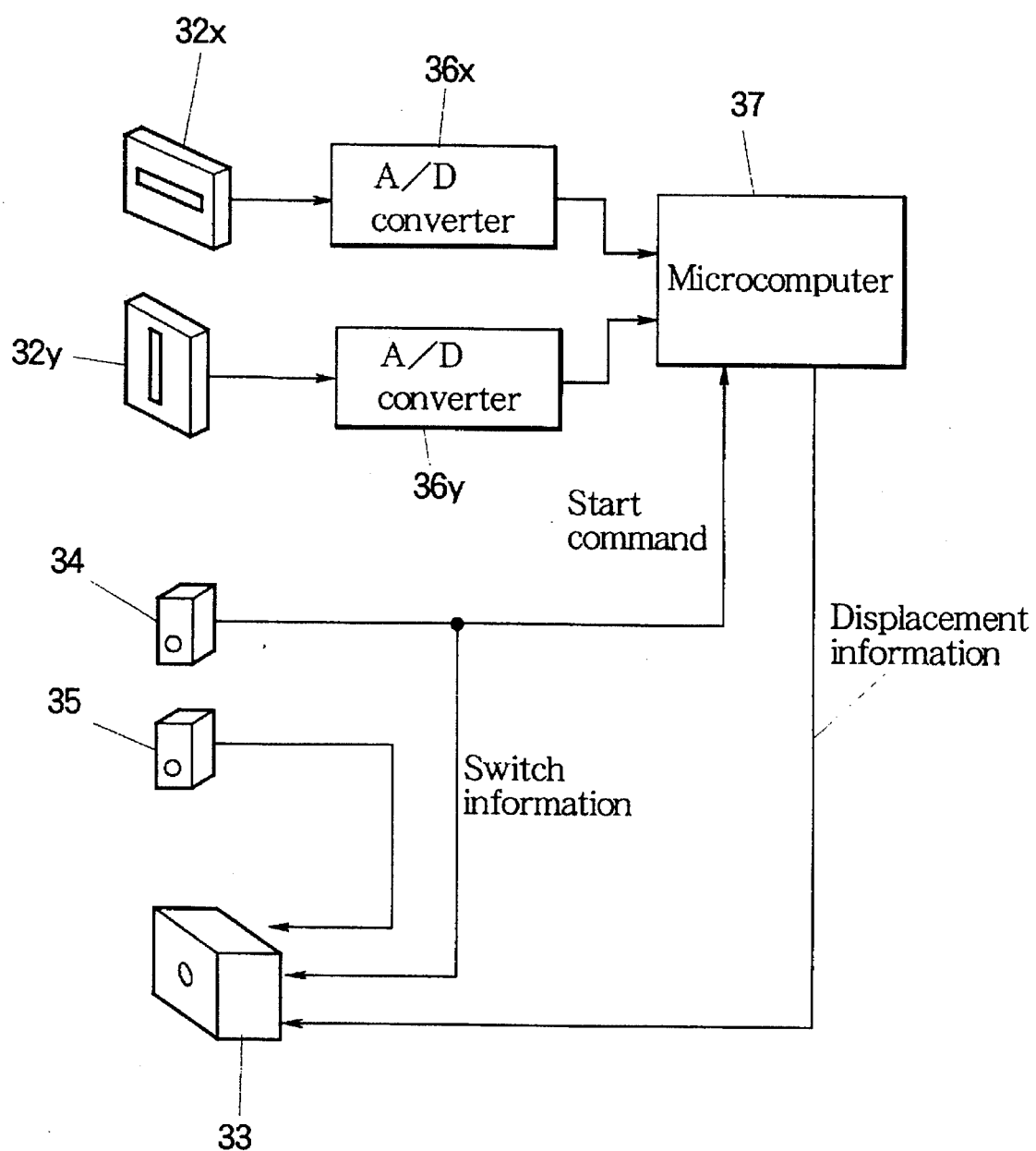
FIG. 7 is a block diagram showing an entire construction of the second embodiment.

Referring to FIG. 7, the remote controller 23 integrates therein the detector composed of the linear image sensor 32x which is connected to a microcomputer 37 through an A/D converter 36x. The other linear image sensor 32y is also connected to the microcomputer 37 through another A/D converter 36y. The first contact 34 is connected to input a start command into the microcomputer 37, and is also connected to input switch information into the transmittier unit 33. The second contact 35 is connected to input switch information into the transmittier unit 33. The microcomputer 37 is connected to feed the displacement information to the transmittier unit 33.

In such a construction of the detector, the microcomputer 37 processes the periodic signal from the linear image sensor 32x to calculate a horizontal component of the displacement of the remote controller in manner shown by the flow chart of FIG. 4. Further, the other periodic signal from the linear image sensor 32y is processed to extract a vertical component of the displacement of the remote controller. The microcomputer 37 initiates the processing in response to the start command, and successively feeds the displacement information to the television set through the transmittier unit 33 by wireless manner. At this moment, the first contact 34 inputs the switch information effective to specify a start point of the displacement information, while the second contact 34 inputs the switch information effective to specify an end point of the displacement information.

Figure 8:
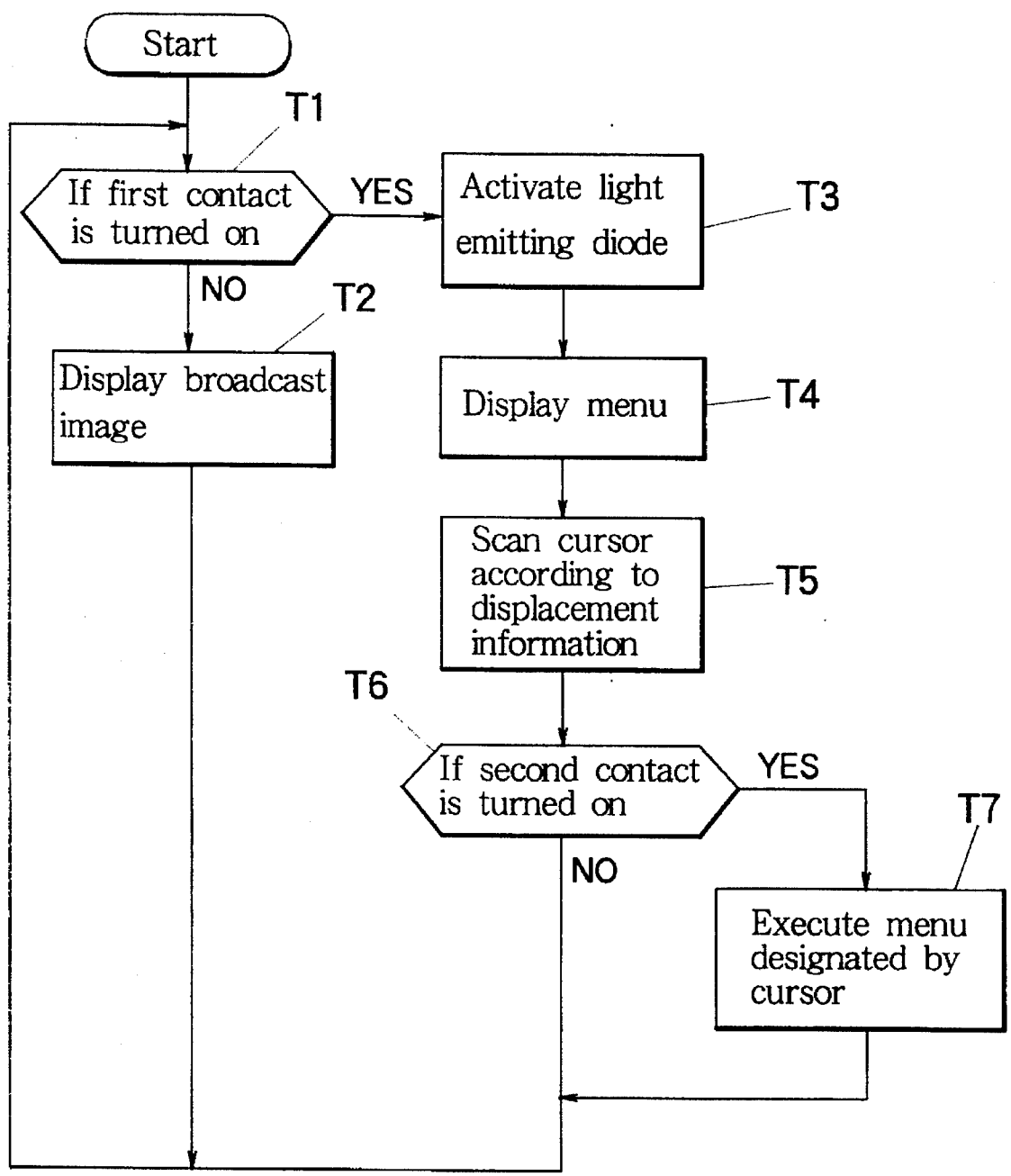
FIG. 8 is a flow chart showing operation of the second embodiment.

Referring to a flow chart of FIG. 8, the television set 22 shown in FIG. 5 operates such that a first step T1 is undertaken after turning on the television set 22 to check as to if the first contact 34 (FIG. 6) is switched on. This check is made by means of the receivier unit 26 which receives the modulated infrared light beam from the transmittier unit 33 and which extracts therefrom the switch information. If the check result of the step T1 is NO, a next step T2 is undertaken to display a regular broadcast image on the screen 29 of the television set 22. If the check result of the step T1 is YES, another step T3 is undertaken to activate the light emitting diode 21 (FIG. 5), which emits the optical ray 24. Then, a step T4 is undertaken to indicate the cursor C and the menu M on the screen 29. Further, a step T5 is undertaken to scan the cursor C according to the two-dimensional displacement information inputted from the remote controller 23. Then, a step T6 is undertaken to check as to if the second contact 35 is switched on. If the check result is YES, a step T7 is undertaken to execute a specific process according to the menu selected by the cursor C. If the check result of the step T6 is NO, the routine returns to the step T1.

Figure 9:
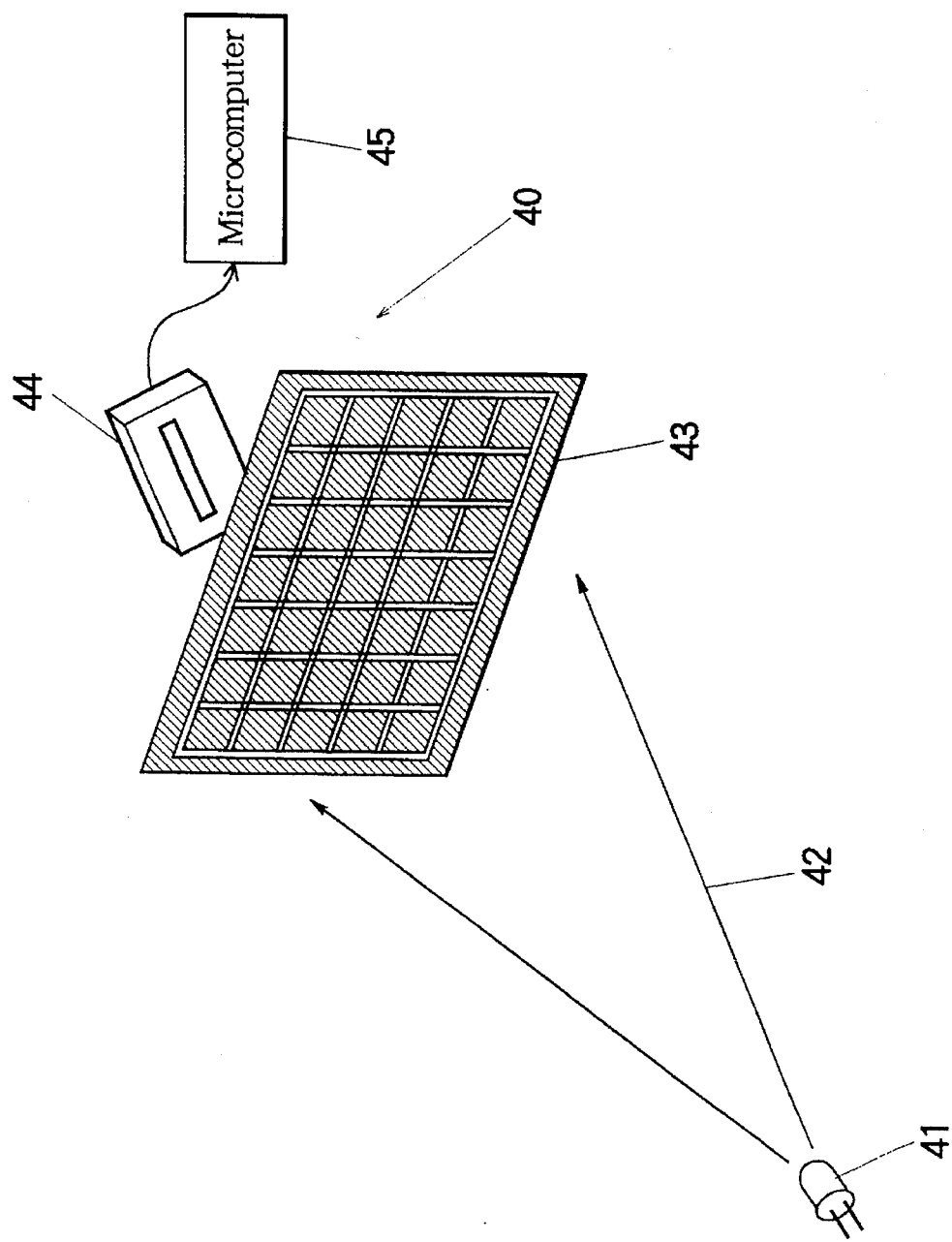
FIG. 9 is a schematic perspective diagram showing a third embodiment of the inventive information input apparatus.

Referring to FIG. 9, a third embodiment of the inventive information input apparatus utilizes the light source composed of a light emitting diode 41 which is disposed at one of the reference point and the implement (not shown in the figure), and which transmits an optical ray 42 to the other of the reference point and the implement. A detector 40 is disposed at the other of the reference point and the implement for receiving the optical ray 42. The detector 40 has modulation means in the form of a lattice slit plate 43 which has a two-dimensional periodic pattern (lattice pattern) extending in first and second directions orthogonal to each other. The detector 40 has photoreceiving means composed of a linear image sensor 44 having a plurality of pixels aligned in a third direction, which intersects with the first and the second directions at different angles. A microcomputer 45 constitutes processor means for processing the periodic signal fed from the linear image sensor 44 to extract a two-dimensional displacement of the implement. In this embodiment, the linear image sensor 44 is arranged in the third diagonal direction relative to the first horizontal direction and the second vertical direction of the lattice slit plate 43 so as to extract the two-dimensional displacement. Alternatively, an area image sensor having a two-dimensional array of pixels may be used in place of the linear image sensor.

Figure 10:
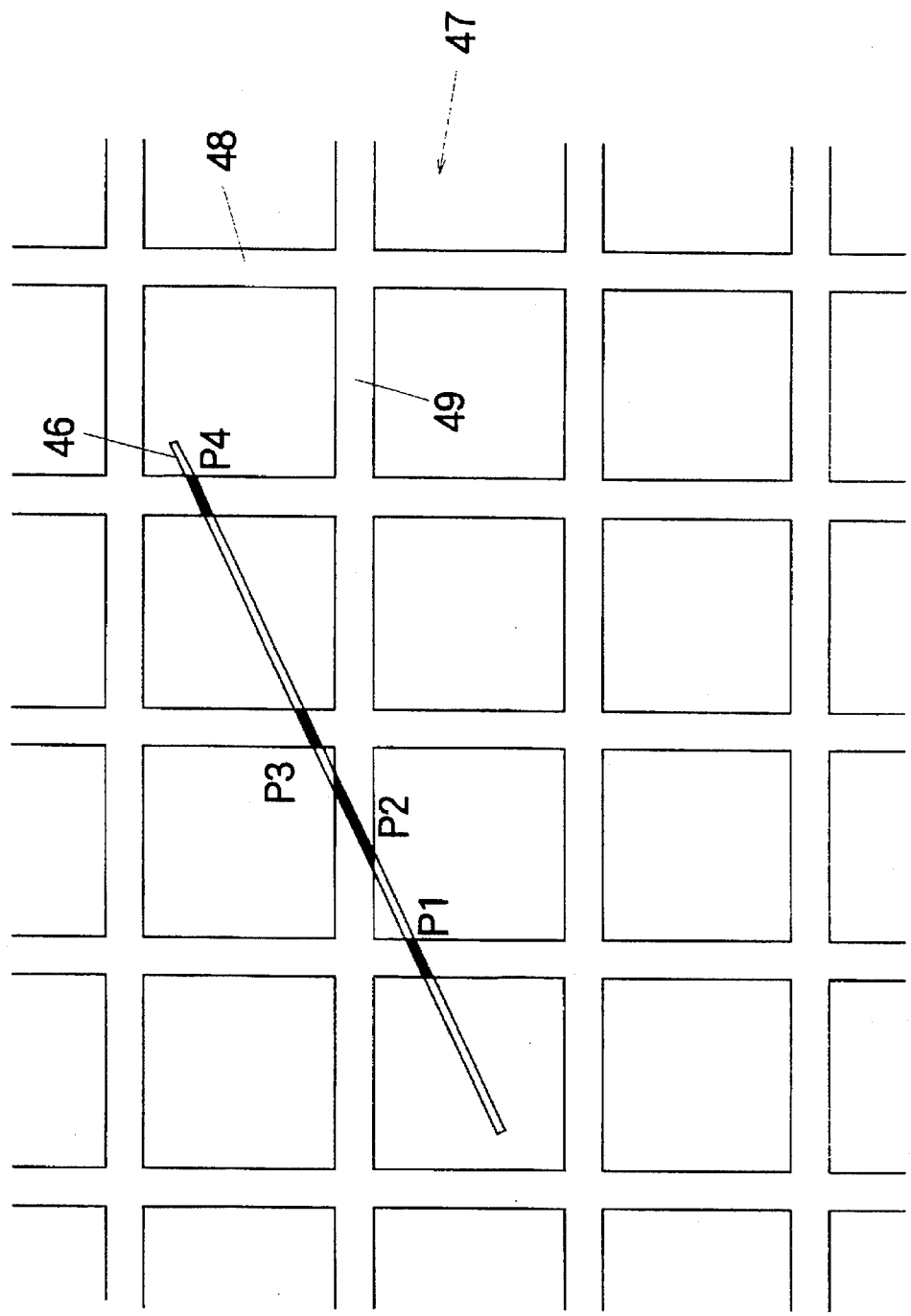
FIG. 10 is a pattern diagram showing a periodic image generated in the third embodiment.

Referring to FIG. 10, a periodic image 47 of the lattice slit plate 43 is projected onto a photoreceiving region 46 of the linear image sensor. The periodic image 47 contains a vertical slit image 48 and a horizontal slit image 49, which are intersects with each other. These slit images shift in the horizontal and vertical directions in response to the manual handling of the implement. The linear image sensor is arranged diagonally to the slit images at an inclination of ½. The linear image sensor has the linear array of the pixels which produce a periodic signal according to an intensity of the projected periodic image. In the illustrated example, the photoreceiving region of the linear image sensor crosses with three vertical slit images so that the periodic signal contains three corresponding peaks P1, P3 and P4. Further, the linear photoreceiving region crosses with one horizontal slit image so that the periodic signal contains one corresponding peak P2. As seen from the figure, the peaks P1, P3 and P4 corresponding to the crossing points of the vertical slit image 48 has a relatively narrow width as compared to that of the peak P2 corresponding to the crossing point of the horizontal slit image 49. The vertical and horizontal components of the two-dimensional displacement are discriminated from each other by the difference in the peak width. By such a manner, the linear image sensor is arranged diagonally relative to the lattice image at an inclination angle deviated from 45° so as to separate the horizontal and vertical components from each other. Namely, a single linear image sensor is efficiently utilized to obtain the two-dimensional displacement information, thereby saving a density of pixels. Alternatively, the linear image sensor is set at the inclination angle of 45°, while a thickness of the vertical and horizontal slit images are set differently from each other.

Figure 11:
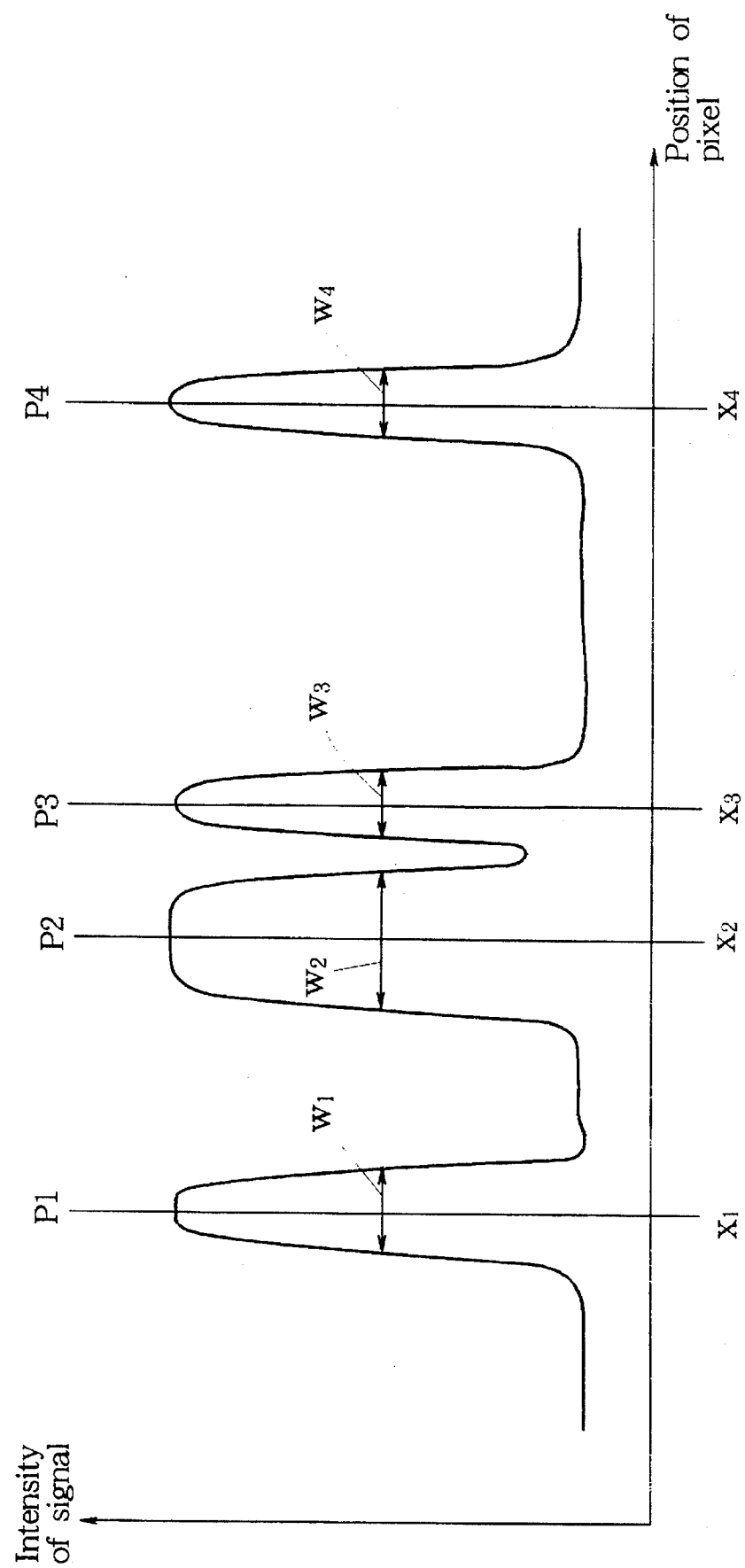
FIG. 11 is a waveform diagram showing a periodic signal generated in the third embodiment.

Referring to FIG. 11, the linear image sensor produces the periodic signal as shown in a graph where an x-axis denotes position of the pixels and a y-axis denotes an intensity of the periodic signal. The periodic signal contains four peaks P1, P2, P3 and P4. The first peak P1 has a peak width W1 and a peak position x1. The second peak P2 has a peak width W2 and a peak position x2. The third peak P3 has a peak width W3 and a peak position x3. The fourth peak P4 has a peak width W4 and a peak position x4. These peak width and peak position vary in response to the shift of the slit image. A peak corresponding to a cross point of the vertical slit image has a relatively small width, while another peak corresponding to a cross point of the horizontal slit image has a relatively great width.

Figure 12:
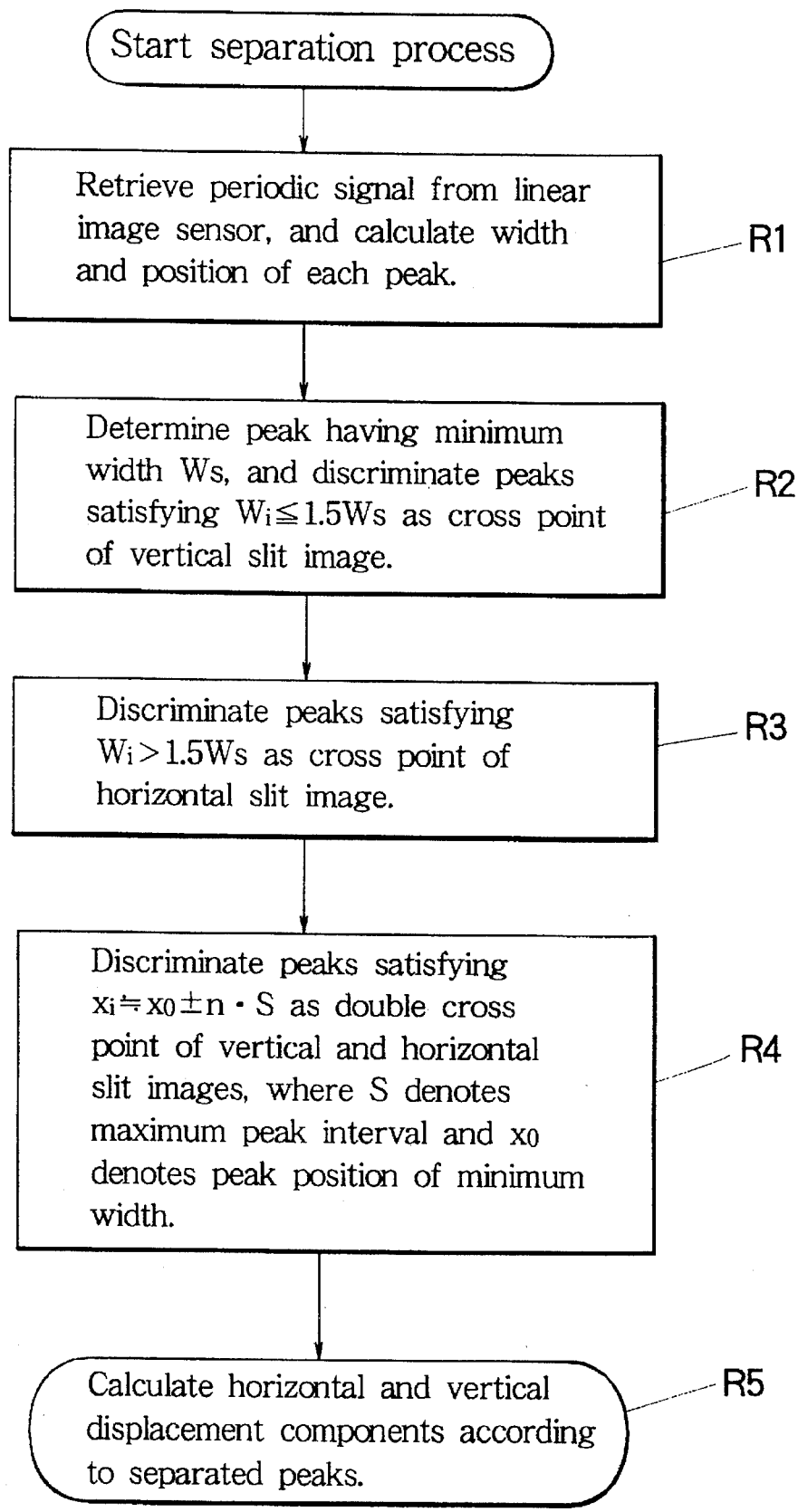
FIG. 12 is a flow chart showing operation of the third embodiment.

Referring to a flow chart of FIG. 12, the periodic signal is processed to separate the vertical displacement component and the horizontal displacement component from each other. After the separation, each of the vertical and horizontal displacement components can be calculated according to the algorithm described in the flow chart of FIG. 4. After initiating the microcomputer 45 (FIG. 9), a first step R1 is carried out to read out the periodic signal from the linear image sensor 49, and processes the periodic signal to calculate the width and the position of each peak. In the example of FIG. 11, the peak positions x1–x4 and the peak widths W1–W4 are calculated. Then, a step R2 is undertaken to execute judgement process. Namely, the judgement is made that a peak having the smallest width Ws should represent a cross point of the vertical slit image. Further, peaks having a width $Wi \leq 1.5\ Ws$ should also represent cross points of the vertical slit image. In the FIG. 11 example, the peaks P1, P3 and P4 meet the above condition. Subsequently, a step R3 is undertaken to execute next judgement process. It is judged that a peak satisfying a condition $Wi > 1.5\ Ws$ should represent a cross point of the horizontal slit image. In the FIG. 11 example, the peak P2 meets this condition. Then, a step R4 is undertaken to execute additional judgement process, which deals with a specific case where an intersection between the horizontal and the vertical slit images is just projected on the sensor face. In such a case, a maximum interval between adjacent peaks is set to S (S=x4–x3 in case of the FIG. 11 example). Then, a position of a peak having the smallest width is set to an origin point x0 (x0=x4 in case of the FIG. 11 example). Further, it is judged that a peak satisfying a condition $x0 = x0 \pm n \cdot S$ (n denotes an integer) within an allowance should represent a double cross point where the horizontal and the vertical slit images concurrently hit the linear image sensor. There is no double cross point in the FIG. 11 example. Thereafter, a step R5 is undertaken to calculate the horizontal and vertical displacement components according to the position data of the separated peaks. This calculation is conducted in manner similar to the algorithm set forth by the FIG. 4 flow chart. It should be noted that horizontal and vertical resolutions are different from each other, because the linear image sensor inclines relative to the horizontal and vertical slit images at different angles.

Figure 13:
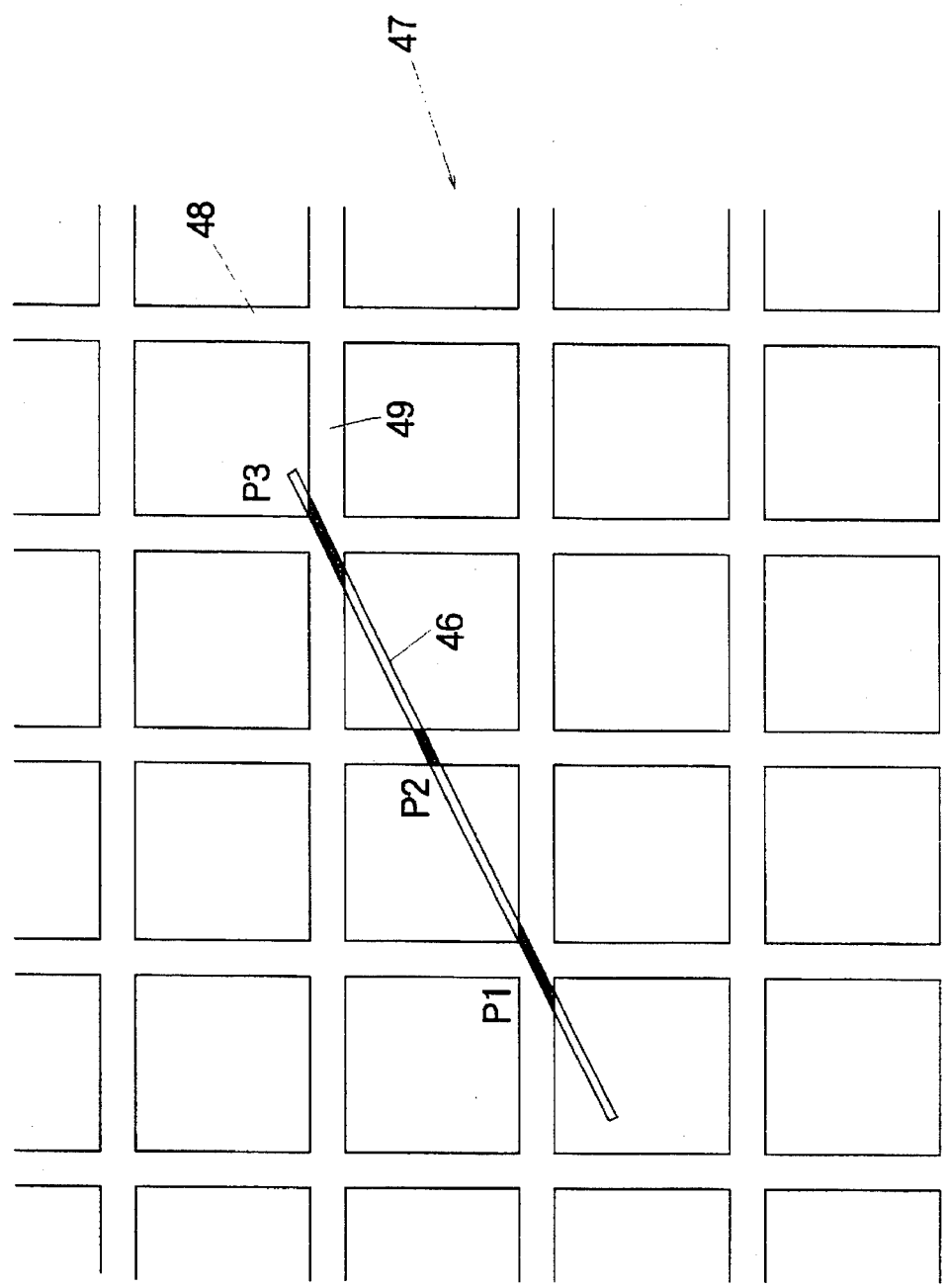
FIG. 13 is a pattern diagram showing a variation of the periodic image.

Referring to FIG. 13, an intersection between the vertical slit image 48 and the horizontal slit image 49 is just projected onto the photoreceiving face 46 of the linear image sensor. Peaks P1 and P3 correspond to the intersection, and a remaining peak P2 corresponds to the vertical slit image 48 alone.

Figure 14:
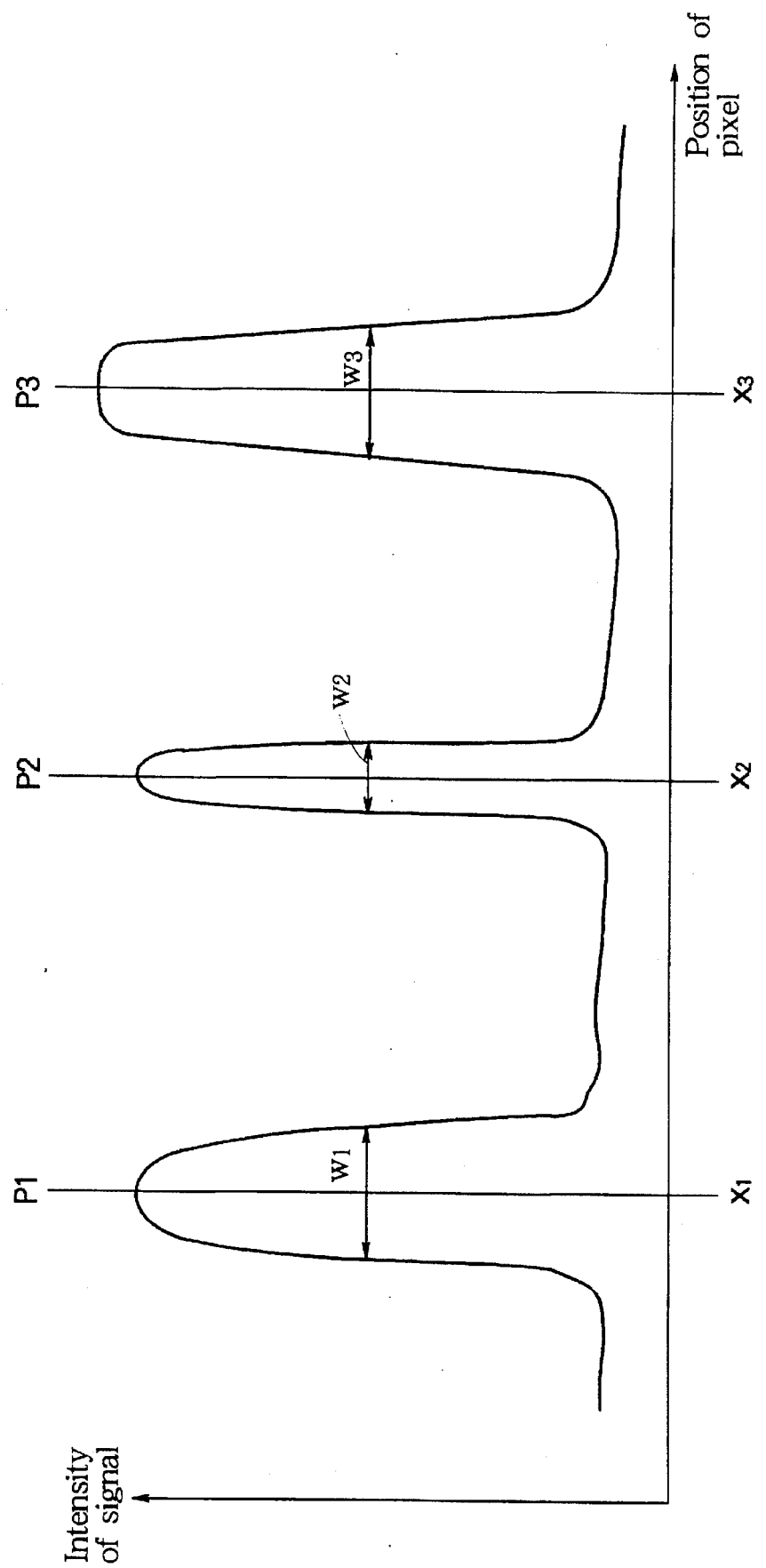
FIG. 14 is a waveform diagram showing a variation of the periodic signal.

Referring to FIG. 14, the periodic signal corresponding to the FIG. 13 example contains the peaks P1 and P3 having relatively great widths W1 and W3, respectively, and the remaining peak P2 having a relatively small width W2. In such a case, the step R4 shown in FIG. 12 is conducted to properly separate the horizontal and vertical slit images from each other. First, a maximum interval between adjacent peaks is set to S. In this case, S=x2–x1 is set. Then, a position of a peak having the smallest width is set to an origin point x0. In this case, x2 is set to x0. Lastly, it is judged that a peak satisfying the condition $xi = x0 \pm n \cdot S$ (n denotes an integer) within an allowance should represent not only a cross point of the horizontal slit image but also a cross point of the vertical slit image. In this case, the peak P1 satisfies the above condition (n=−1) and is therefore judged to be a double cross point. The peak P3 also satisfies the above condition (n=+1) and is therefore judged to be another double cross point.

As described above, according to the invention, the light source is disposed at the reference point, while the detector is integrated into the implement. The implement is manually handled to vary the incident angle of the optical ray relative to the detector. The displacement information is calculated according to the variation of the incident angle and is inputted into a computer machine or the like. The manual displacement of the implement can perform an input of an analog amount and a pointing operation without use of a pad which would be required for the conventional mouse implement. The inventive implement is handled freely to input the displacement information to thereby improve the operability. The inventive implement is constructed to input incremental information so as to save the number of pixels in the image sensor. Alternatively, the light source is integrated into the implement, while the detector is fixed to the reference point. The spatial optical modulation means is interposed therebetween to enable the input of the relative displacement information. In such a case, the detector may be preferably disposed at the machine to enable direct input of the information without use of wireless data transmission. A pair of multi-slit plates and a pair of linear image sensors are used in combination to enable production of the two-dimensional displacement information without use of a costly area image sensor so as to achieve a two-dimensional scanning of a cursor. Further, one linear image sensor is arranged diagonally to a lattice slit plate so as to detect the two-dimensional displacement information by simpler construction. Additionally, the inventive implement is applied to a remote controller of the television set to improve the operability which would suitable for future multi-media use. The detector may be disposed at the television set, while the remote controller is integrated with an infrared optical source which may be used as a transmittier unit in as well as the optical source.

What is claimed is:

1. An information input apparatus for inputting information into a machine, comprising: an implement manually operable to vary at least one of a position and a direction thereof relative to a reference point; at least one light source disposed at one of the implement and the reference point for transmitting an optical ray to the other one of the implement and the reference point; and a detector disposed at the other one of the implement and the reference point for receiving the optical ray to detect a physical variation in the position or the direction of the implement so as to input displacement information representative of an incremental/decremental amount into the machine according to the detected physical variation; wherein the detector comprises light modulation means having a periodic pattern for spatially modulating the optical ray to form a periodic image which shifts in response to the physical variation of the implement, receiving means comprising an image sensor having an array of pixels for capturing the shifting periodical image to output a corresponding periodic signal, and processor means for processing the periodic signal to extract therefrom the physical variation of the implement to thereby form the displacement information which is input to the machine.

2. An information input apparatus according to claim 1; further comprising manually-actuated switch means mounted to the implement to input a start command effective to control the processor means to start extraction of the physical variation of the implement.

3. An information input apparatus according to claim 1; wherein the at least one light source is disposed at the reference point and the detector is integrated into the implement so that the detector detects a change in direction or position of the implement in terms of an incident direction of the optical ray, which varies in response to a manual movement of the implement.

4. An information input apparatus according to claim 1; wherein the at least one light source is disposed at the implement and the detector is disposed at the reference point so that the detector detects a change in direction or position of the implement in terms of an incident position of the optical ray, which varies in response to a manual movement of the implement.

5. An information input apparatus according to claim 1; wherein the modulation means has a periodic pattern extending along a one-dimensional direction, the receiving means comprises a linear image sensor having a linear array of pixels aligned in the one-dimensional direction, and the processor means includes means for determining a change in the physical orientation of the implement in the one-dimensional direction.

6. An information input apparatus according to claim 1; wherein the modulation means has a pair of one-dimensional periodic patterns separate from each other and orthogonal to each other, the receiving means comprises a pair of linear image sensors disposed orthogonally to each other and each having a linear array of pixels aligned in a one-dimensional direction, and the processor means includes means for processing the periodic signals output by the pair of the linear image sensors to determine a two-dimensional change in physical orientation of the implement.

7. An information input apparatus according to claim 1; wherein the modulation means has a two-dimensional periodic pattern extending along first and second directions, the receiving means comprises a linear image sensor having a linear array of pixels aligned in a third direction which intersects with the first and second directions at different angles, and the processor means includes means for processing the periodic signal output by the image sensor to determine a two-dimensional change in physical orientation of the implement.

8. An information input apparatus according to claim 1; wherein the implement is configured as a remote control device for inputting displacement information into a television set to remotely control the television set according to the displacement information.

9. An information input device comprising: an implement having a movable portion capable of undergoing a change in at least one of the attitude and the position thereof with respect to a reference point, the change in attitude or position being representative of a desired incremental change in a data value; a light source disposed proximate one of the movable portion and the reference point for transmitting a light to the other one of the movable portion and the reference point; and a detector disposed proximate the other one of the movable portion of the implement and the reference point for receiving the transmitted light and providing a corresponding periodic electrical output used to detect a change in the attitude or the position of the movable portion indicative of the incremental change in the data value; wherein the detector comprises a light modulator having a periodic modulating pattern plate thereon for spatially modulating the transmitted light to form a periodic image which varies in response to a change in at least one of the attitude and the position of the implement with respect to the reference point, an image sensor having an array of pixels for receiving the periodic image and outputting the corresponding periodic electrical signal, and processing means for processing the periodic electrical signal to detect therefrom a change in attitude or position of the implement and deriving therefrom the incremental change in data value.

10. An information input device according to claim 9; further comprising a manually-activatable switch mounted on the implement for producing a start command effective to control the processing means to start responding to the change in attitude or position of the movable portion of the implement with respect to the reference point.

11. An information input device according to claim 9; wherein the light source is disposed at the reference point and the detector is mounted on the movable portion of the implement such that the detector detects the physical variation of the implement in terms of an incident direction of the transmitted light.

12. An information input device according to claim 9; wherein the light source is disposed at the implement and the detector is disposed at the reference point such that the detector detects a change in orientation of the implement in terms of an incident position of the transmitted light.

13. An information input device according to claim 9; wherein the light modulator has a periodic pattern extending substantially in a first direction, the receiving means is composed of a linear image sensor having a linear array of pixels aligned in the first direction, and the processor means includes means for determining a change in physical orientation of the implement in the first direction.

14. An information input device according to claim 9; wherein the light modulator has a pair of one-dimensional periodic patterns separate and orthogonal to each other, the receiving means comprises a pair of linear image sensors disposed orthogonally to each other and each having a linear array of pixels aligned in a one-dimensional direction, and the processor means includes means for processing signals output by the pair of linear image sensors to determine a change in physical orientation of the implement.

15. An information input device according to claim 9; wherein the light modulator has a periodic pattern two-dimensionally patterned along first and second directions, the receiving means comprises a linear image sensor having a linear array of pixels aligned in a third direction which intersects with the first and second directions at different angles, and the processor means includes means for processing signals output by the image sensor to determine a two-dimensional change in physical orientation of the implement.

16. An information input device according to claim 9; wherein the implement is configured as a remote control device for inputting displacement information into a television set to remotely control the television set according to the displacement information.

17. An information input device comprising: a machine having a light source for emitting a light; and an input implement comprising transmitting means for transmitting data to the machine, periodic image modulating means for receiving light emitted by the light source and forming a periodic image in accordance with the received light, light receiving means for receiving the periodic image and outputting a corresponding electrical signal, and processing means for processing the electrical signal and determining therefrom the physical orientation of the input implement with respect to a predetermined reference point.

18. An information input device according to claim 17; wherein the input implement is a wireless remote control device.

19. An information input device according to claim 17; wherein the periodic image modulating means comprises a first modulating plate having a series of horizontal slits extending in a vertical direction.

20. An information input device according to claim 19; wherein the periodic image modulating means further comprises a second modulating plate having a series of vertical slits extending in a horizontal direction.

21. An information input device according to claim 17; wherein the periodic image modulating means includes means for converting the received light into a periodic pattern image.

22. An information input device according to claim 17; wherein the transmitting means comprises means for transmitting data in the form of modulated light.

23. An information input device according to claim 17; wherein the machine further comprises means for receiving and processing data transmitted by the input implement.

24. An information input device according to claim 17; wherein the input implement further comprises a manually operated two-stage switch, the first stage for controlling the processing means to determine a data value to be changed in accordance with a change in physical orientation of the input implement, and a second stage for controlling the processing means to commence determining a change in physical orientation of the input implement.

\* \* \* \* \*